Sept. 13, 1927.  M. A. MARQUETTE  1,642,455
STRIPPING DEVICE
Filed Sept. 29, 1925
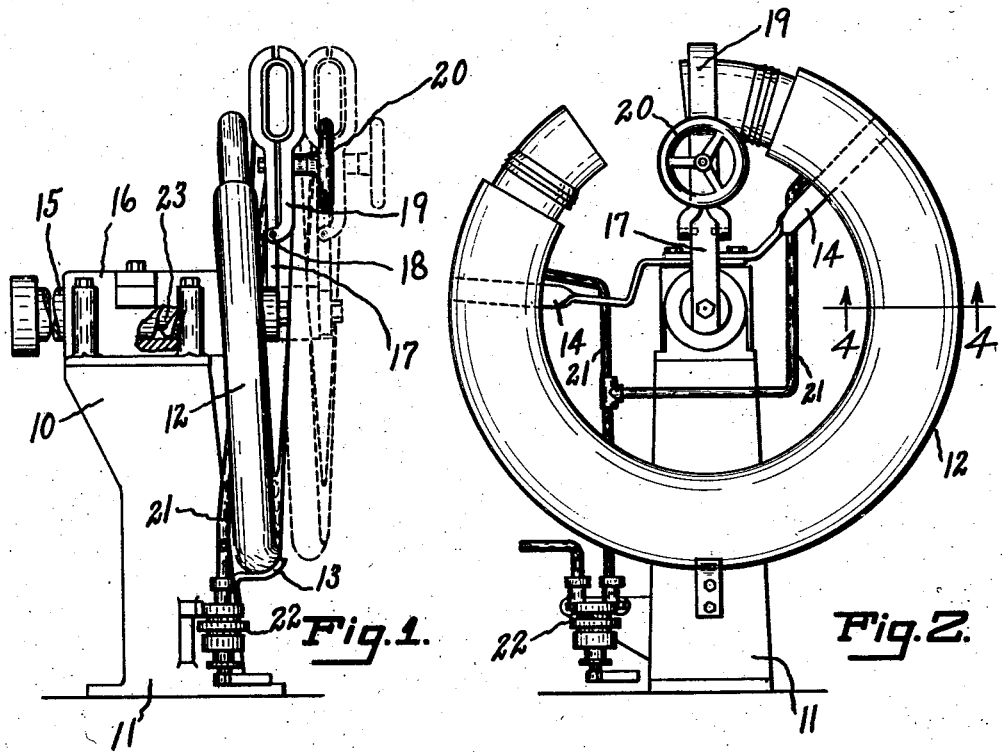
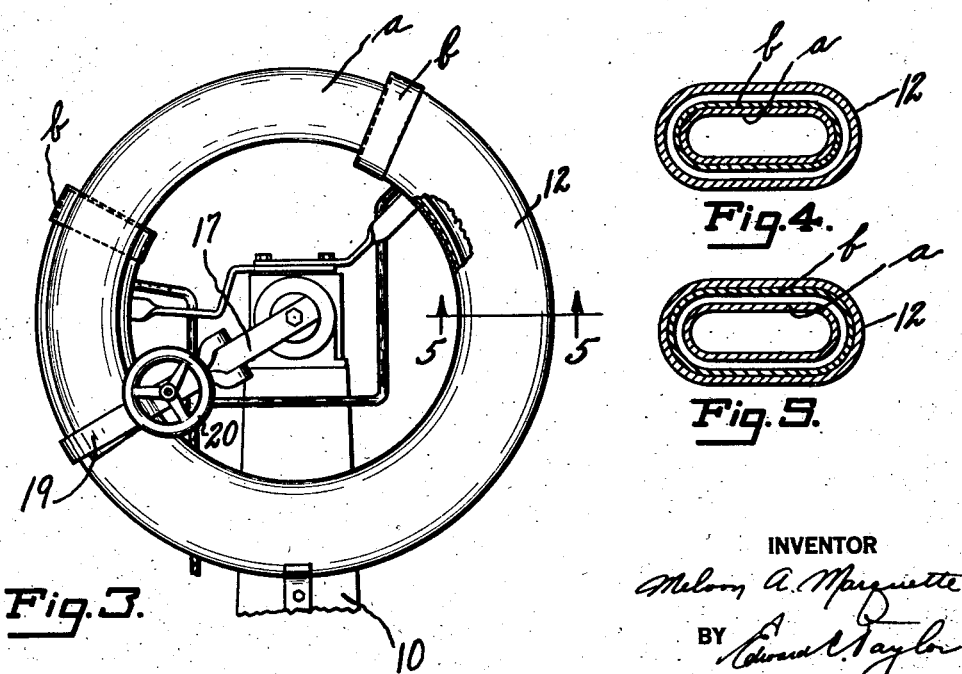
INVENTOR
Melory A. Marquette
BY
ATTORNEY Patented Sept. 13, 1927.

1,642,455

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

STRIPPING DEVICE.

Application filed September 29, 1925. Serial No. 59,330.

My present invention relates to the stripping from their vulcanizing mandrels of rubber tubes such as are used for inner tubes for automobile tire casings. Since the advent of the so-called balloon tire it is becoming more and more customary to vulcanize the larger tubes which these tires require on circular mandrels. The operation of stripping the tubes from these circular mandrels is more difficult than the operation of stripping tubes from straight mandrels such as were used before, and renders even more desirable the use of some mechanical device. According to my present invention the tubes are first separated from their mandrels by exerting a suction upon them, and they are then held expanded away from the mandrels while the mandrel is withdrawn.

Referring to the drawings,

Fig. 1 is a side elevation, partly broken away, showing in full lines the start of the stripping operation, and in dotted lines the position of the parts after the stripping is completed.

Fig. 2 is a front elevation of the same;

Fig. 3 is a front elevation, with certain parts omitted, showing an intermediate stage in the stripping operation;

Fig. 4 is a section on line 4—4 of Fig. 2; and

Fig. 5 is a section on line 5—5 of Fig. 3.

The mandrels which have been shown in the drawings are of helical form and of generally oval cross section, although the shape may be varied. Upon the frame 10 of a base 11 is mounted a hollow casing 12 of substantially the shape of the mandrel to be used and formed in a helix in the same manner as the mandrel. This casing is supported for convenience on a bracket 13 and the top end is held by brackets 14 at its sides. The casing is arranged concentrically with a shaft 15 which passes through a journal box 16 mounted on the frame 10. On the end of the shaft is fixed an arm 17 having its outer end formed to extend about half way around the end of the mandrel. Pivoted to the arm at 18 is a swinging member 19 having its end formed similarly to the end of arm 17. A hand screw 20 passes freely through the member 19 and is screwed into the arm 17. By tightening the screw the ends of the swinging member can be drawn towards the end of the arm so as to grip the mandrel between the two pieces.

The interior of the casing 12 is connected to pipes 21 which, through a valve 22, connect with a vacuum producing device. The valve is of the usual three-way type, by means of which the inside of the casing can be connected either to the vacuum or to the air.

The shaft 15 is formed with a screw thread 23 meshing with a corresponding thread in the inside of the journal box 16. By this construction rotation of the shaft will both turn the arm 17 and cause the latter to take a cork-screw path. This motion of the arm corresponds with the pitch of the spiral on which the mandrel is formed. Any suitable means can be provided for rotating the shaft in either direction desired.

The operation of the device may now be considered. A mandrel $a$ with a tube $b$ upon it is mounted in the clamp formed by the arm 17 and the member 19, and the hand screw 20 tightened, while the shaft 15 and the arm 17 are in the positions shown in dotted lines in Fig. 1. By rotating the shaft the mandrel may now be caused to thread itself into the casing, assuming the position shown in full lines in that figure. This corresponds to the showing in Fig. 2. The ends of the rubber tube are now folded back over the ends of the casing, as shown in Fig. 3, and the vacuum turned on. This causes the tube to leave the mandrel and stretch itself to the inside surface of the casing, as is shown by the contrast between the positions of the tube shown in Figs. 4 and 5. The mandrel is thus freed from all frictional restraint after the tube has been removed from contact with it, and by a simple rotation of the shaft can be threaded out of the casing and tube. An intermediate stage in this operation is shown in Fig. 3. When the mandrel has been entirely removed from the casing it may be released from the clamp formed by arm 17 and member 19 and taken off the machine. The vacuum may now be broken by turning the valve 22 so as to admit air between the casing and the tube. The latter will then contract to the size in which it was vulcanized and may be readily withdrawn from the casing. The apparatus is now ready for the stripping of another tube.

It will be understood that changes may be made in the details of the mechanism and that the proportion and arrangement of parts may be varied within wide limits while keeping within the scope of the invention as pointed out in the appended claims. Furthermore, by a simple inversion of operations the apparatus described may be used to place tubes on mandrels instead of removing them therefrom. The tube is inserted in the casing 12, its ends folded back, and the vacuum applied. The mandrel may now be inserted and the vacuum released, whereupon the tube will contract upon the mandrel.

Having thus described my invention I claim:

1. A device for stripping tubes from spiral mandrels which comprises a casing having a curvature similar to and a cross-section larger than that of the tube when mounted on the mandrel, means for exhausting air from between the tube and the casing to free the tube from the mandrel, and means for moving the mandrel within the casing in the spiral path.

2. A device for stripping rubber tubes from spiral mandrels comprising a casing having a curvature similar to that of the mandrel and cross-sectional size larger than the tube, means for holding a mandrel detachably inside the casing and for moving the mandrel within the casing in a spiral path, and means for exhausting air from between the tube and the casing.

3. A device for stripping rubber tubes from spiral mandrels which comprises a support, a spiral casing fixed to said support, a shaft journaled in said support, an arm fixed on said support, mandrel clamping means carried by the arm, means for controlling the rotation of the shaft so that said clamping means will travel in a curve corresponding to the axis of the casing, and means for exhausting the air from the inside of said casing.

MELVON A. MARQUETTE.